(12) United States Patent
Bird et al.

(10) Patent No.: US 11,114,059 B2
(45) Date of Patent: Sep. 7, 2021

(54) SYSTEM AND METHOD FOR COLOR CALIBRATION

(71) Applicant: Portrait Displays, Inc., Pleasanton, CA (US)

(72) Inventors: Darrell Bird, Seattle, WA (US); James Lund, Kingston, WA (US); Derek Smith, Snohomish, WA (US); Mark Schindler, Seattle, WA (US); Melissa Thompson, Renton, WA (US); Mackenzie Collins, Seattle, WA (US); Josh Palmer, Seattle, WA (US); Mark Ryals, Lake Forest Park, WA (US); Victoria Olivares, Lake Stevens, WA (US); Jason Ramirez, Lake Stevens, WA (US); Larry Allen Heberlein, Seattle, WA (US); Tyler Pruitt, Everett, WA (US); Catherine Meininger, Lynnwood, WA (US)

(73) Assignee: Portrait Displays, Inc., Pleaston, CA (US)

( * ) Notice: Subject to any disclaimer, the term of this patent is extended or adjusted under 35 U.S.C. 154(b) by 0 days.

(21) Appl. No.: 16/663,597

(22) Filed: Oct. 25, 2019

(65) Prior Publication Data

US 2020/0143767 A1 May 7, 2020

Related U.S. Application Data

(60) Provisional application No. 62/754,645, filed on Nov. 2, 2018.

(51) Int. Cl.
*G09G 5/02* (2006.01)
*G01J 3/46* (2006.01)
*G01J 3/50* (2006.01)

(52) U.S. Cl.
CPC .............. *G09G 5/02* (2013.01); *G01J 3/463* (2013.01); *G01J 3/506* (2013.01); *G09G 2320/0693* (2013.01)

(58) Field of Classification Search
CPC ....... G09G 2330/12; G09G 2320/0693; G09G 2320/0666; G09G 5/02; G09G 3/006;
(Continued)

(56) References Cited

U.S. PATENT DOCUMENTS 7,102,648 B1 * 9/2006 Holub ................. G06F 3/14
345/589
7,671,991 B2 3/2010 Von Orelli et al.
(Continued)

OTHER PUBLICATIONS

Ohno, et al., Four-Color Matrix Method for Correction of Tristimulus Colorimeters Part 1, IS&T Sixth Color Imaging Conference, 301-305; 1997 National Institute of Standards Technology, Gaithersburg, Maryland.

(Continued)

*Primary Examiner* — Sanjiv D. Patel
(74) *Attorney, Agent, or Firm* — McCarter & English, LLP

(57) ABSTRACT

Described herein is a color calibration system and method including a display device including a non-volatile memory, a display screen, and a target sensor. The system and method further can include a computing system in communication with the display device and including a processor, a persistent memory, a temporary memory, and a reference sensor. A calibration matrix can be derived using the reference and target data captured by the target and reference sensors. The calibration matrix can be used to calibrate the target sensor using the calibration matrix.

18 Claims, 14 Drawing Sheets

(58) Field of Classification Search
CPC .. G09G 2360/16; G09G 3/2003; G09G 5/005; G09G 2320/0285; G01J 3/524; G01J 3/506; G01J 3/46
See application file for complete search history.

(56) References Cited

U.S. PATENT DOCUMENTS

| | | | |
|---|---|---|---|
| 8,441,470 B2 | 5/2013 | Hlbi | |
| 9,047,807 B2 | 6/2015 | Kwong et al. | |
| 9,163,990 B2 | 10/2015 | Lianza et al. | |
| 2003/0185438 A1* | 10/2003 | Osawa | H04N 1/6083 382/162 |
| 2009/0021587 A1* | 1/2009 | Snyderman | G01J 3/10 348/207.11 |
| 2009/0179881 A1* | 7/2009 | Hibi | G09G 3/3611 345/207 |
| 2010/0188418 A1* | 7/2010 | Sakai | G01J 3/50 345/594 |
| 2010/0265266 A1* | 10/2010 | Liu | G09G 5/02 345/600 |
| 2012/0074851 A1* | 3/2012 | Erinjippurath | G09G 3/20 315/158 |
| 2013/0169700 A1* | 7/2013 | Park | G09G 5/02 345/690 |
| 2014/0139570 A1* | 5/2014 | Albrecht | G09G 5/06 345/694 |
| 2015/0229919 A1* | 8/2015 | Weber | G01J 3/506 348/184 |
| 2015/0302824 A1* | 10/2015 | Matsushita | G09G 3/006 345/690 |
| 2017/0270896 A1* | 9/2017 | Cope | G09G 5/02 |
| 2018/0225075 A1* | 8/2018 | Park | G09G 3/3233 |

OTHER PUBLICATIONS

Ohno, et al., Four-Color Matrix Method for Correction of Tristimulus Colorimeters Part 2 IS&T Sixth Color Imaging Conference, 1998 National Institute of Standards Technology, Gaithersburg, Maryland.

* cited by examiner

SYSTEM AND METHOD FOR COLOR CALIBRATION

CROSS-REFERENCE TO RELATED APPLICATION

The present application claims priority benefit to a provisional patent application entitled "System and Method for Color Calibration," which was filed on Nov. 2, 2018, and assigned Ser. No. 62/754,645. The entire content of the foregoing provisional patent application is incorporated herein by reference.

FIELD OF THE DISCLOSURE

The present disclosure relates to the system and method of charactering, calibrating and deploying an embedded filter color measurement device and applying the calibrated data to perform a calibration of the embedded display.

BACKGROUND OF THE DISCLOSURE

A sensor may not be capable of being used in a tethered application because it may not meet the Luther Condition. In the case of exotic filter designs, there is always some deviation from the design goal that can often lead to increased errors when comparing displays of different spectral content. U.S. Pat. No. 9,163,990 (hereinafter, Lianza) demonstrates an exemplary mechanism to calibrate a device with nominal CMF (color matching function) response for different input spectra. In this example, each device is spectrally characterized, and a specific matrix is derived analytically based upon an assumed collection of arbitrary input spectra. The spectral characterization of the system is time consuming and it is best left to tethered devices that meet a prescribed price/performance value condition. The process described in Lianza is very time consuming and it can fail if the filters are not sufficiently blocked for transmission of energy outside of the visual range of wavelengths as defined by the CIE 1931 color matching functions.

For the specific case of laptop device calibration, U.S. Pat. No. 9,047,807 (hereinafter Kwong) describes a specific location of an arbitrary sensor within a laptop environment. Kwong describes the steps in physically initiating a "closed lid" calibration process and the various indicators used to alert the operator of the various stages of the process, however, does not address the mechanism used to calibrate the internal sensor nor the explicit use of said data from that sensor. In the U.S. Pat. No. 8,441,470 (hereinafter, Hibi) describers a calibration process used and the correction method employed for said process. However, Hibi requires a supplementary Infrared Absorption filter to be placed prior to the Tri-Chromatic X, Y and Z filter. This is needed because it is expensive to add IR blocking to arbitrarily colored filters rather than just adding IR absorption prior to the filter themselves.

SUMMARY OF THE DISCLOSURE

Described herein is a system and method which enables high accuracy color measurement capabilities using a wide range of low cost color filter/sensor combinations. The key element in the described system and method is inclusion of near-infrared measurement data in the computation of the calibration matrix. While using traditional least squares methodology to arrive at a color calibration matrix, the inclusion of the long wavelength data allows for significant improvement in calibration capabilities.

In one embodiment, a color calibration system can include a display device including a non-volatile memory, a display screen, and a target sensor. The system further can include a computing system in communication with the display device and including a processor, a persistent memory, a temporary memory, and a reference sensor. The computing system can be configured to execute an instance of a calibration application.

The computing system can be configured to detect and capture, via the reference sensor, reference data based on display data rendered on the display screen of the display device and store the reference data in the temporary memory. The display device can be configured to detect and capture, via the target sensor, target data based on display data rendered on the display screen of the display device and transmit the target data to the computing system. The computing system can be configured to receive the target data, store the target data in the temporary memory, derive, via the calibration application, a calibration matrix using the reference and target data stored in the temporary memory, and calibrate the target sensor using the calibration matrix.

The target and reference data can include luminance and color data. The display screen of the display device can be configured to display luminance patterns. The target and reference sensors can be configured to capture the luminance data based on the each of the luminance patterns rendered on the display screen. The computing system can be configured to derive, via the calibration application, a linear calibration for the target sensor based on the luminance data captured by the reference and target sensor.

In response to the computing system deriving the linear calibration, the display screen of the display device can be configured to display color patterns. The target and reference sensors can be configured to capture the color data based on each of the color patterns rendered on the display screen. The computing system can be configured to derive, via the calibration application, the calibration matrix based on the color data captured by the target and reference sensors.

The display screen can be a LED, OLED, or LCD display. The display device can be a least one of: television, computer monitor, or mobile device screen. The target sensor can be embedded in a remote control mounted to the display device, the target sensor being in a position to interface with the display screen of the display device. The target sensor can be embedded in a rotating mount coupled to the display device. The target sensor can be magnetically attached to a bezel of the display device. A mirror periscope can include the target sensor and can be embedded in a bezel of the display device.

In one embodiment, a color calibration method can include detecting and capturing, via a reference sensor of a computing system, reference data based on display data rendered on the display screen of the display device. The computing system can be in communication with a display device, and can include a processor, persistent memory, temporary memory and execute an instance of a calibration application. The method can further include storing, via the computing system, the reference data in the temporary memory, detecting and capturing, via a target sensor of the display device including a non-volatile memory and a display screen, target data based on display data rendered on the display screen of the display device, transmitting, via the display device, the target data to the computing system. The method can further include receiving, via the computing system, the target data, storing, via the computing system, the target data in the temporary memory, deriving, via the calibration application executing on the computing system, a calibration matrix using the reference and target data stored in the temporary memory, and calibrating, via the computing system, the target sensor using the calibration matrix.

The target and reference data can include luminance and color data. The method can further include displaying, via the display screen of the display device, a plurality of luminance patterns, capturing, via the target and reference sensors, the luminance data based on the each of the plurality of luminance patterns rendered on the display screen and deriving, via the calibration application of the computing system, a linear calibration for the target sensor based on the luminance data captured by the reference and target sensor. The method can further include displaying, via the display screen of the display device, a plurality of color patterns in response to the computing system deriving the linear calibration, capturing, via the reference and target sensors, the color data based on each of the plurality of color patterns rendered on the display screen and deriving, via the calibration application executing on the computing system, the calibration matrix based on the color data captured by the target and reference sensors.

In one embodiment, the calibration system can include a display device including a processor, non-volatile memory, and a display screen. The display device can be configured to execute an instance of a calibration application. The system can further include one or more target sensors disposed with respect to the display device. The system can further include a computing system in communication with the display device and target sensors and including a processor, a persistent memory, a temporary memory, and a reference sensor. The computing system can be configured to detect and capture, via the reference sensor, reference data based on display data rendered on the display screen of the display device, and transmit the reference data to the display device.

The one or more target sensors can be configured to detect and capture target data based on display data rendered on the display screen of the display device, and transmit the target data to the display device. The display device can be configured to receive the reference data, receive the target data, store the reference and target data in the non-volatile memory, derive, via the calibration application, a calibration matrix using the reference and target data stored in the non-volatile memory, and calibrate the target sensor using the calibration matrix.

Additional advantageous features, functions and benefits of the present disclosure will be apparent from the description which follows, particularly when read in conjunction with the accompanying figures.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF THE DISCLOSURE

The exemplary embodiments disclosed herein are illustrative of methods and related systems for color calibration including a display device including a non-volatile memory, a display screen, and a target sensor. The described system and method can further include a computing system in communication with the display device and including a processor, a persistent memory, a temporary memory, and a reference sensor. The computing system can be configured to execute an instance of a calibration application.

The computing system can be configured to detect and capture, via the reference sensor, reference data based on display data rendered on the display screen of the display device and store the reference data in the temporary memory. The display device can be configured to detect and capture, via the target sensor, target data based on display data rendered on the display screen of the display device and transmit the target data to the computing system. The computing system can be configured to receive the target data, store the target data in the temporary memory, derive, via the calibration application, a calibration matrix using the reference and target data stored in the temporary memory, and calibrate the target sensor using the calibration matrix.

Figure 6:
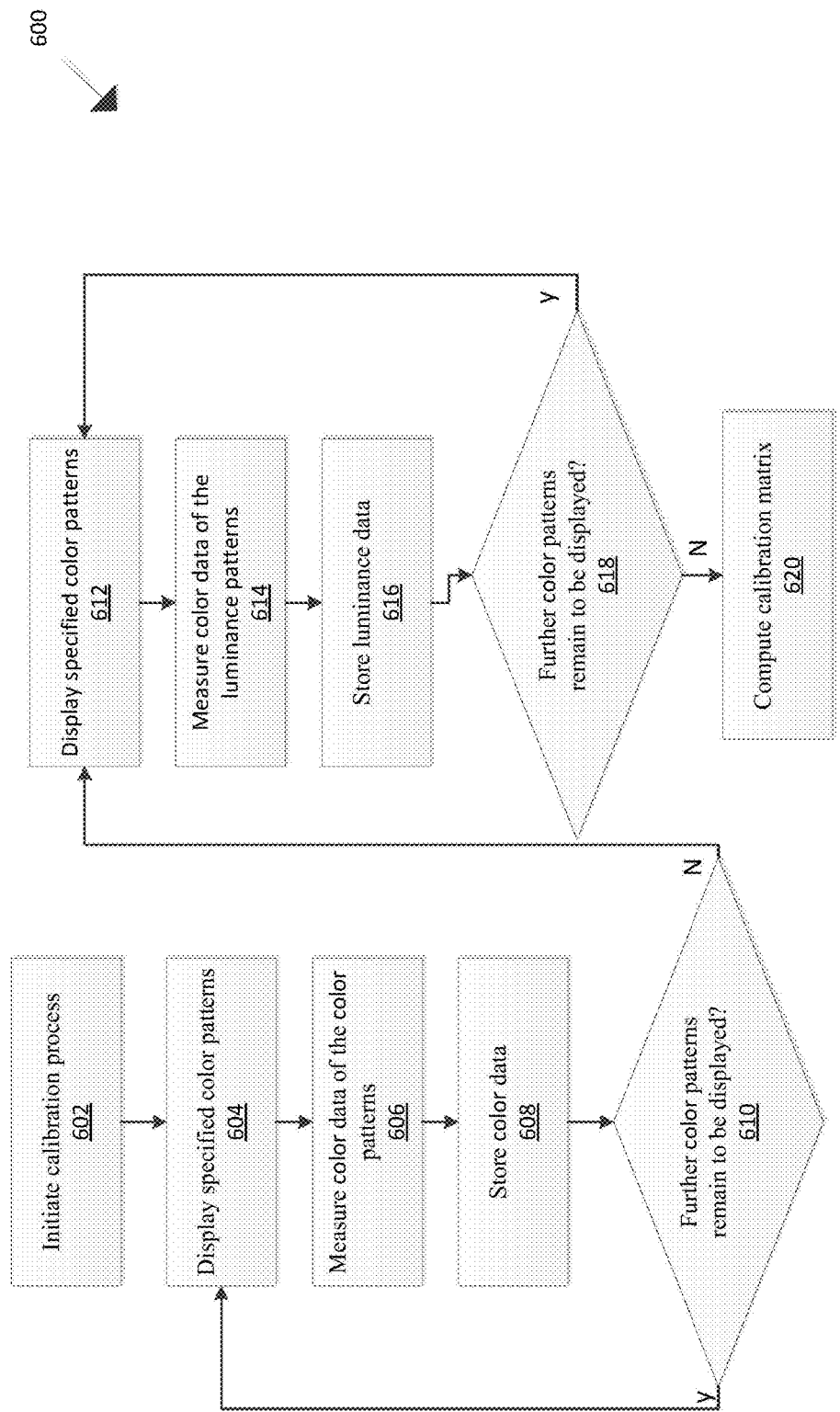
FIG. 6 illustrates a process of the color calibration system in accordance to an exemplary embodiment.

Described herein is a system and method which enables high accuracy color measurement capabilities using a wide range of low cost color filter/sensor combinations. The system and method include near-infrared measurement data in the computation of the calibration matrix. When a sensor is embedded in a mobile device or television monitor, the need for precise conformance to Color Matching Function Response is relaxed due to the additive nature of the Red, Green, Blue output of the LCD or OLED under test and the fact that the sensor is used with a single set of primary measurements. As an example, an embedded device can be directly relatable to the measurements of a standard reference device. LCD devices change characteristics as a function of viewing angle, so it is important to manage the viewing angle of the embedded sensor to closely match, or be less than, the viewing angle of the reference instrument. FIG. 6 shows a typical design to minimize viewing angle differences. A well calibrated sensor can also be used in a display device such as a television and can be used for one or more of: ambient light detection, an aid to improve visible comfort, or display calibration for accurate color. The calibration method that enables the high accuracy color measurement capability of the sensor involves two distinct calibration components: Linearization-Gain (LG) and Color Matrix determination (CMD).

Figure 1:
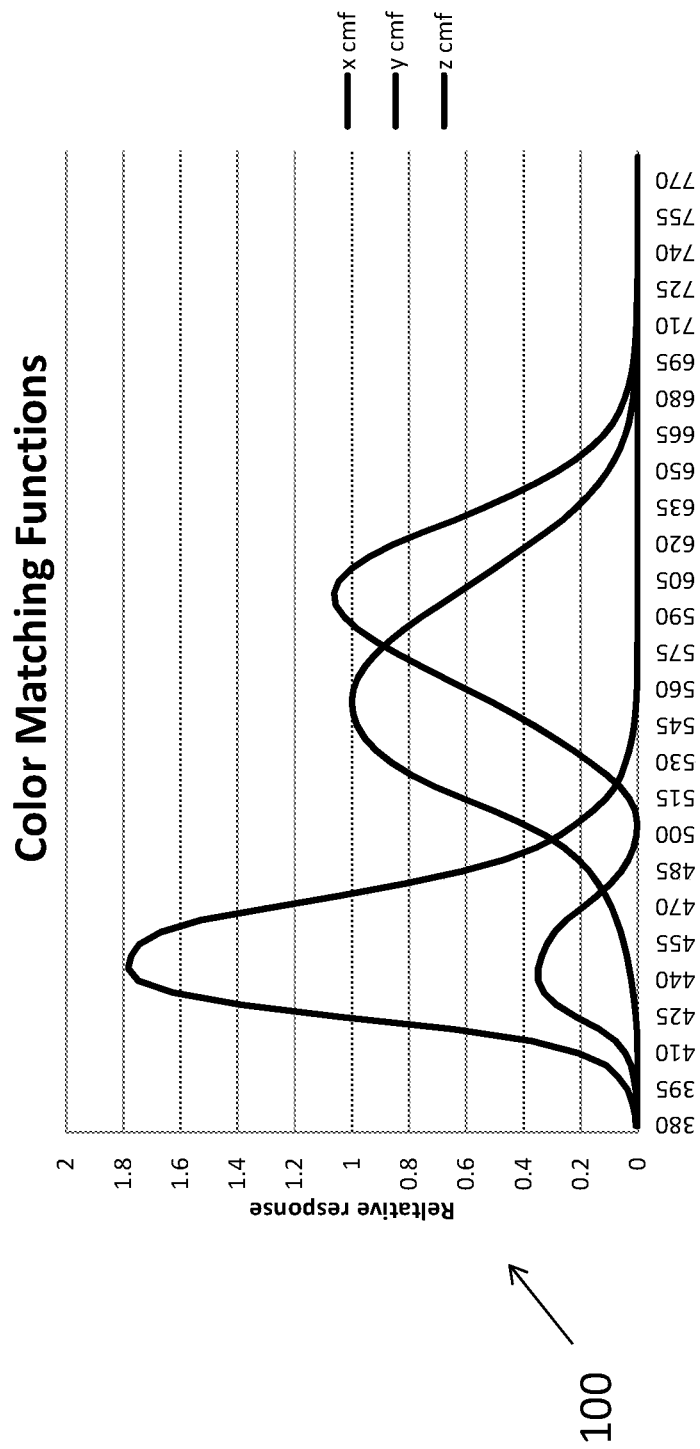
FIG. 1 depicts a plot of the CIE 1931 color matching functions in accordance with an exemplary embodiment.

FIG. 1 depicts a plot 100 of the CIE 1931 color matching functions in accordance with an exemplary embodiment. A measurement device that can meet that can be calibrated such that the response functions are a linear combination of the CMFs is said to meet the Luther Condition. The plot 100 shows the CIE color matching response curves show responses beyond 700 nm. In some embodiments, is responsivity can go up to 780 nm.

Figure 2:
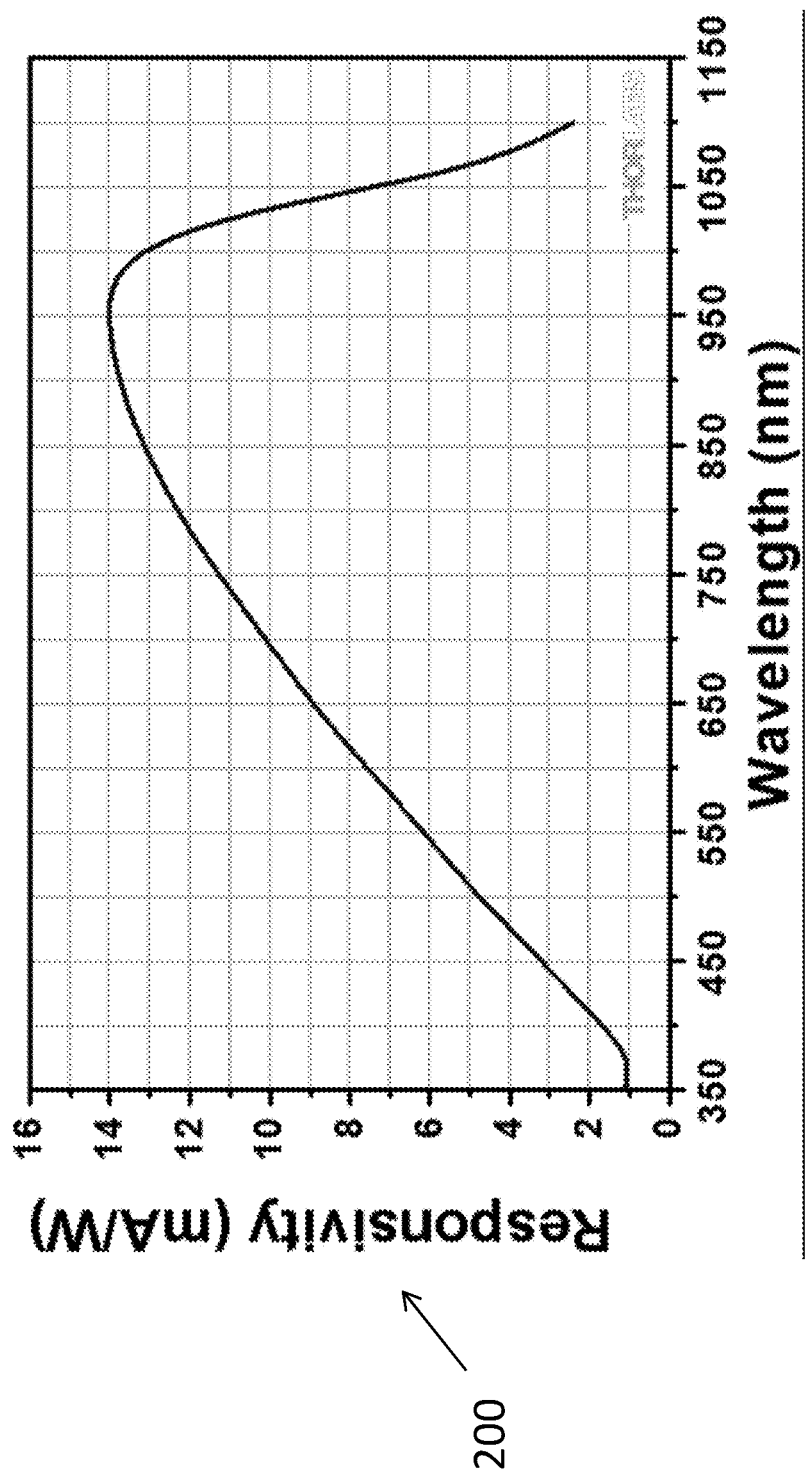
FIG. 2 depicts a plot of silicon photodiode responsivity in accordance with an exemplary embodiment.

FIG. 2 depicts a plot 200 of silicon photodiode responsivity in accordance with an exemplary embodiment. The plot 200 shows the responsivity of the silicon sensor extends well beyond the 700 nm region with high sensitivity in the near IR region of the spectrum.

Figure 3:
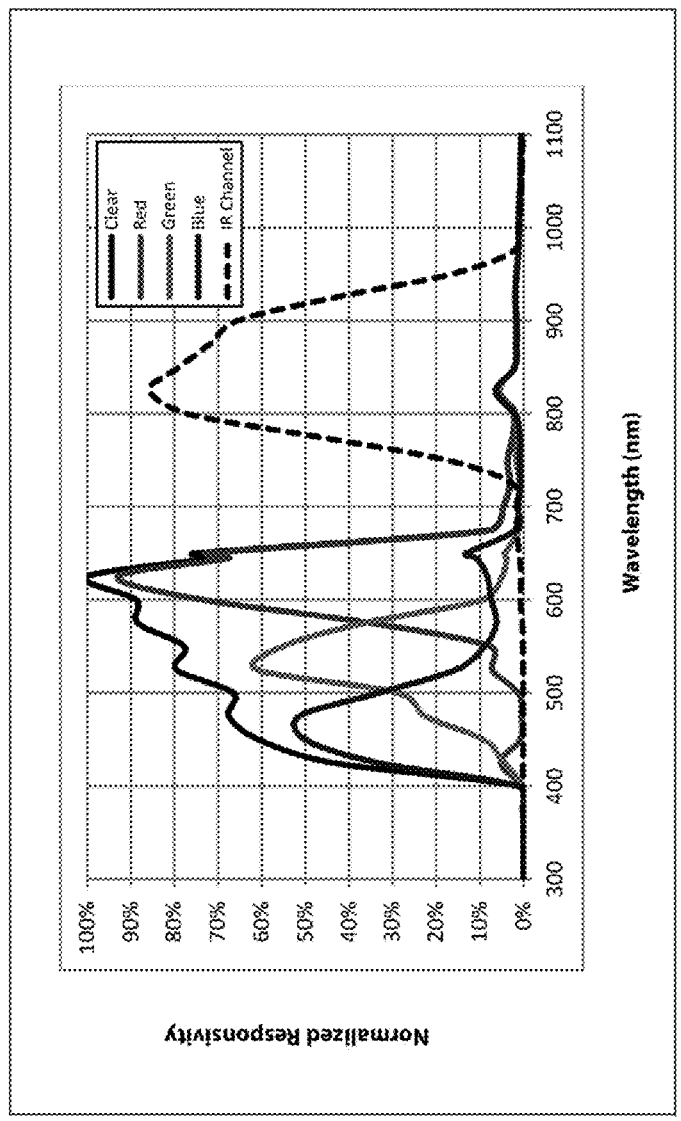
FIG. 3 depicts responsivity characteristics of an RGB and IR filter set according to an exemplary embodiment.

FIG. 3 depicts responsivity characteristics of a Red Green Blue (RGB) and IR filter set according to an exemplary embodiment. The plot 300 shows that the blue filter response is significant in the Green and Red regions of the spectrum and that there is some transmission in the Near IR as well. The goal of a color calibration process is to achieve an optimal match to the color matching function response. The filter response shown in FIG. 3 is indicative of the problem.

Figure 4A:
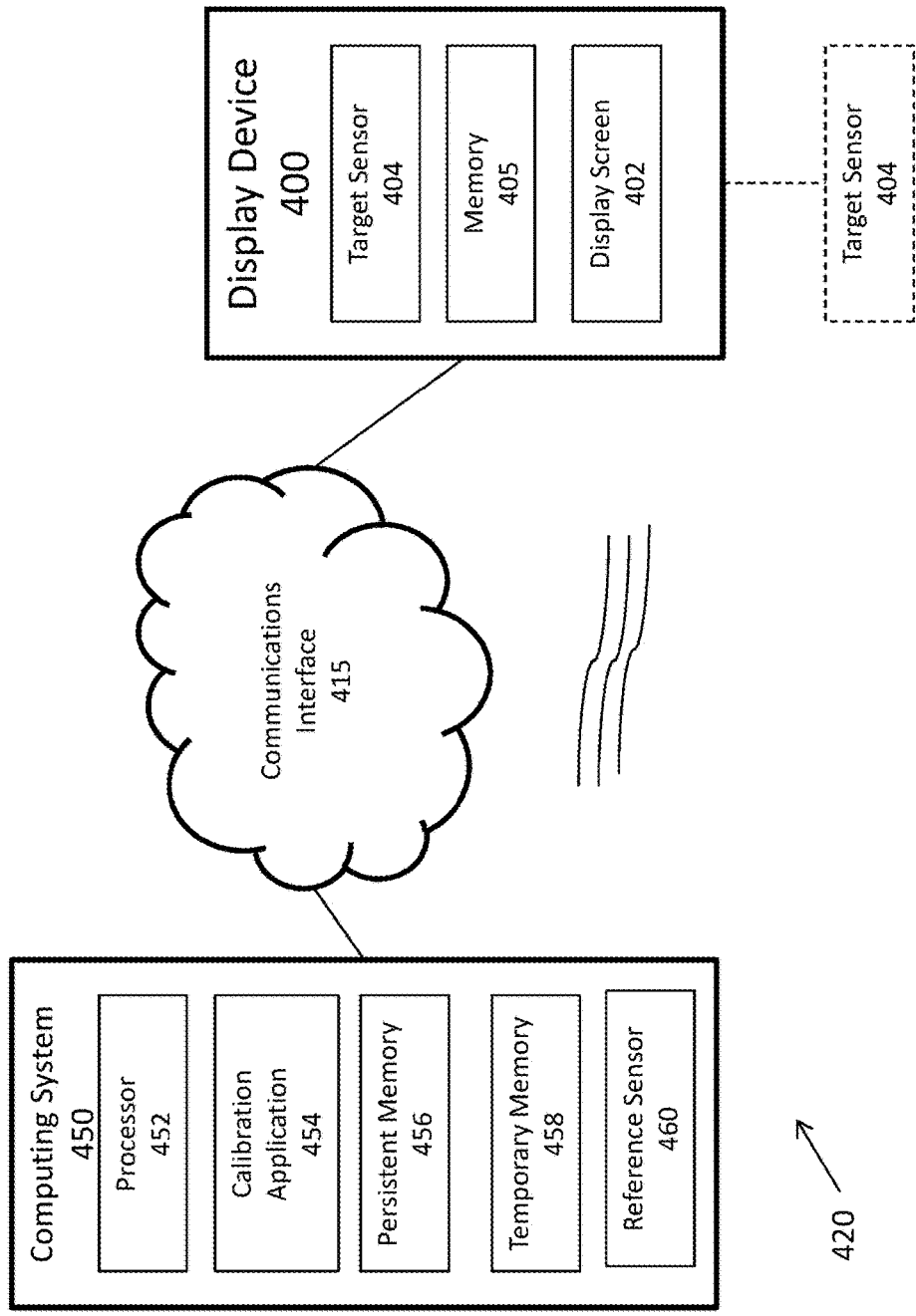
FIGS. 4A-B illustrate a block diagram of a color calibration system in accordance to an exemplary embodiment.
Figure 4B:
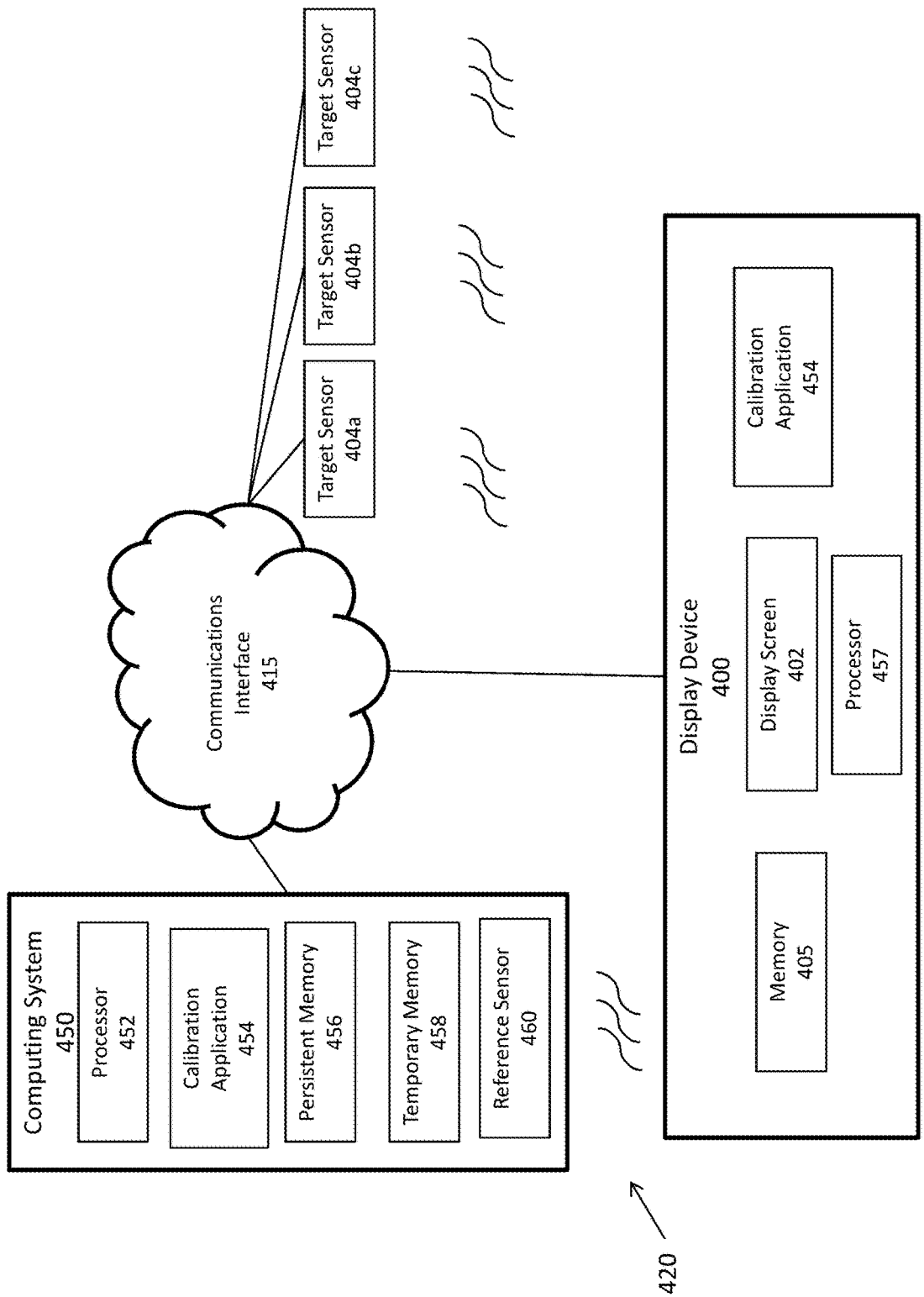

FIGS. 4A-4B illustrate a block diagram of a color calibration system 420 in accordance with an exemplary embodiment. With reference to FIG. 4A, in one embodiment, the color calibration system 420 can include one or more computing systems 450, and one or more display devices 400, communicating over a communications interface 415. The display device 400 can include a display screen 402, a memory 405, and a target sensor 404. The target sensor 404 can be embedded or attached to the display device 400. The computing system 400 can include a processor 452, calibration application 454, persistent memory 456, temporary memory 458, and a reference sensor 460. The computing system 400 can execute one or more instances of the calibration application 454 to implement the color calibration system 420. The calibration application 454 can be an executable application residing on the computing system 450. The computing system 450 can be embodied as one or more servers.

In an example embodiment, one or more portions of the communications interface 415 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, Near Field Communication (NFC) interfaces such as Bluetooth®, or any other type of network, or a combination of two or more such networks.

The computing system 450 includes one or more computers or processors configured to communicate with the display device 400 via the communications interface 415. The computing system 450 hosts one or more applications configured to interact with one or more components of the color calibration system 420. The persistent and temporary memory 456, 458 can be located at one or more geographically distributed locations from the first computing system 450. Alternatively, the persistent and temporary memory 456, 458 can be included within the computing system 450.

In one embodiment, a calibrated reference sensor 460 can be attached to or residing in the computing system 450. The calibrated reference sensor 460 can detect and capture data from the display screen 402. The captured data can be stored in temporary memory 458. The target sensor 404 can detect and capture data from the display screen 402. The display device 400 can transmit the captured data to the computing system 450, via the communications interface 415. The captured data can be stored in temporary memory 458. The calibration application 454 can execute the linearization process and calculate the calibration matrix, as will be described in further detail with respect to FIGS. 5 and 6. The computing system 450 can transmit the calculated calibration matrix to the display device 400, via the communications interface 415. The display device 400 can store the calibration matrix in the memory 405. The display device 400 can calibrate the target sensor 404 using the calibration matrix stored in the memory 405.

With reference to FIG. 4B, one or more target sensors 404a-c can be disposed externally to the display device 400. An instance of the calibration application 454 can reside on the display device 400. The display device 400 can also include a processor 457. The calibrated reference sensor 460 can detect and capture data from the display screen 402. The captured data can be stored in temporary memory 458. The captured data can be transmitted to the display device 400. The display device 400 can store the captured data in the memory 405.

The target sensors 404a-c can detect and capture data from the display screen 402. The target sensors 404a-c can transmit the captured data to the display device 400, via the communications interface 415. The calibration application 454 residing on the display device can execute the linearization process and calculate the calibration matrix as will be described in further detail with respect to FIGS. 5 and 6. The calibration matrix can be stored in the memory 405. The calibration application 454 residing on the display device 400 can calibrate the target sensors 404a-c using the calibration matrix stored in the persistent memory 456.

With reference to both FIGS. 4A-4B, the reference sensor 460 and target sensor 404 (or 404a-c) can be color sensors. Color sensors can detect and capture color measurement, determination, and distinguish between colors reflected off of a reflective surface such as a display device 400. In this regard, the reference sensor 460 and target sensor 404 (or 404a-c) can detect and capture color measurements, determinations, and distinguish between colors displayed on the display screen 402 of the display device 400. As described above, the reference sensor 460 can be already calibrated, while the target sensor 404 (or 404a-c) can be calibrated based on the calculated calibration matrix. As a non-limiting example, the reference 402 and target sensor 404 (or 404a-c) can be embodied as AMS TCS 3430 and AS7261. The display device 400 can be one or more of a: television, computer screen, mobile device, or any other type of display device 400. The display screen 402 can be a LCD or LED display.

Figure 5:
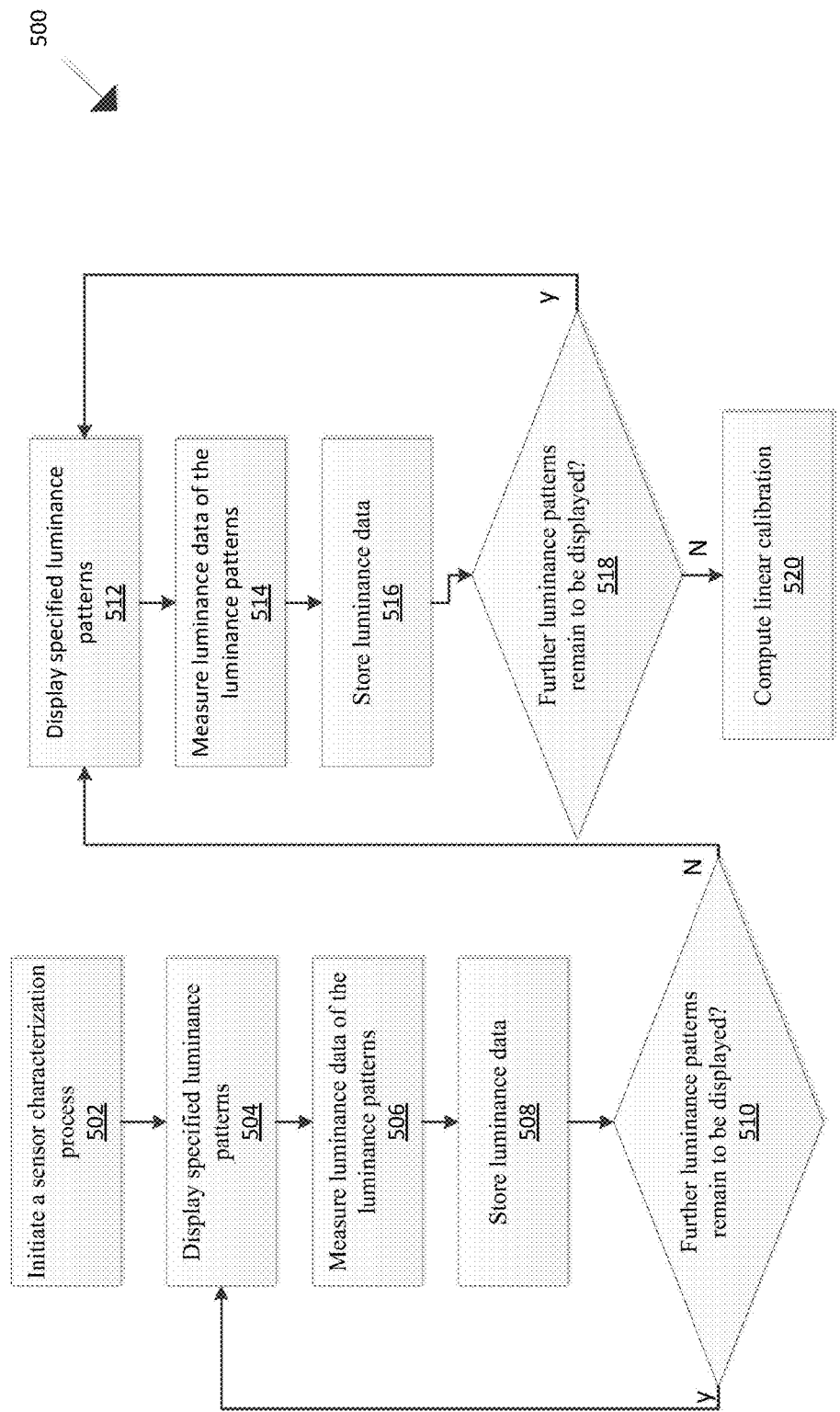
FIG. 5 illustrates a process of the color calibration system in accordance to an exemplary embodiment.

FIG. 5 illustrates a linearization process 500 for a sensor in accordance with an exemplary embodiment. In operation 502, the calibration application (i.e., calibration application 454 as shown in FIGS. 4A-B) can initiate a sensor characterization process. In operation 504, the display screen (i.e., display screen 402 as shown in FIGS. 4A-B) can display specified luminance patterns. In operation 506, a calibrated reference sensor (e.g., reference sensor 460 as shown in FIGS. 4A-B) can measure luminance data of the luminance patterns displayed on the display screen. In operation 508, the captured luminance data can be stored in a temporary memory (e.g., temporary memory 458 as shown in FIG. 5). In operation 510, the calibration application can determine whether further luminance patterns of the specified luminance patterns remain to be displayed. In the event, further luminance patterns remain to be displayed, the calibration application can execute operations 504-508 of the linearization process 500 for each of the luminance patterns of the specified luminance patterns. The luminance captured by reference sensor for each of the luminance patterns can be stored in the temporary memory. The number of specified luminance patterns can vary, however, as a non-limiting example, the number of luminance patterns can be 15-17.

In operation 512, the same specified luminance patterns are displayed on the display screen. In operation 514, a target sensor (e.g., target sensor 404, 404a-c as shown in FIGS. 4A-B) can measure luminance data of the luminance patterns displayed on the display screen. In operation 516, the captured luminance data can be stored in the temporary memory. In operation 518, the calibration application can determine whether further luminance patterns of the specified luminance patterns remain to be displayed. In the event, further luminance patterns remain to be displayed, the calibration application can execute operations 512-516 of the linearization process 500 for each of the luminance patterns of the specified luminance patterns. The luminance captured by target sensor for each of the luminance patterns can be stored in the temporary memory.

In operation 520, the calibration application can compute the linear calibration using the luminance captured by the reference sensor and the luminance captured by the target sensor. The computing of linear calibration can include generating a linearization look up table or a numerical mapping based upon regression analysis. The use of regression analysis allows for calibration of absolute luminance as well as linearization.

The luminance properties of the display (GL) and the color properties of the display (CMD) the data from both data collection processes (i.e., data captured by the reference and target sensor) can be combined and stored in a single data storage device. While calibrating a display device both sets of data can be used to determine optimum exposure and linearity correction (GL) and then calculate the color correction using the data that has been corrected for linearity (GL).

When calibrating a display device of a monitor or television, the measurements can be made essentially simultaneously. It can be appreciated, that when calibrating a display device of a mobile device (i.e., a laptop) it is necessary to perform the embedded sensor measurements with the laptop cover closed. The reference measurements require that the laptop cover be in an open position, and the display exposed to the reference sensor. The laptop display may then be in a closed position, and the embedded sensor data is captured.

Once the embedded sensor has been characterized for linearity and gain, as described with respect to FIG. 5, the calibration process, as described with respect to FIG. 6 can be executed by the calibration application.

FIG. 6 illustrates a calibration process of the color calibration system in accordance to an exemplary embodiment. In operation 602, the calibration application (i.e., calibration application 454 as shown in FIGS. 4A-B) can initiate the calibration process 600. In operation 604, the display screen (i.e., display screen 402 as shown in FIGS. 4A-B) can display specified color patterns. In operation 606, a calibrated reference sensor (i.e., reference sensor 460 as shown in FIGS. 4A-B) can measure color data of the color patterns displayed on the display screen. As an example, White, Red, Green, and Blue patterns, each at 5 luminance levels for a total of 20 reads, can be captured. In operation 608, the captured color data can be stored in a temporary memory (i.e., temporary memory 458 as shown in FIG. 4). In operation 610, the calibration application can determine whether further color patterns of the specified color patterns remain to be displayed. In the event, further color patterns remain to be displayed, the calibration application can execute operations 604-608 of the calibration process 600 for each of the color patterns of the specified color patterns. The color captured by reference sensor for each of the color patterns can be stored in the temporary memory. The number of specified color patterns can vary, however, as a non-limiting example, the number of color patterns can be 15-17.

In operation 612, the same specified color patterns are displayed on the display screen. In operation 614, a target sensor (i.e., target sensor 404, 404a-c as shown in FIGS. 4A-B) can measure color data of the color patterns displayed on the display screen. As an example, White, Red, Green, and Blue patterns, each at 5 luminance levels for a total of 20 reads, can be captured. In operation 616, the captured color data can be stored in the temporary memory. In operation 618, the calibration application can determine whether further color patterns of the specified color patterns remain to be displayed. In the event, further color patterns remain to be displayed, the calibration application can execute operations 612-616 of the linearization process 600 for each of the color patterns of the specified color patterns. The color captured by target sensor for each of the color patterns can be stored in the temporary memory.

In operation 620, the calibration application can compute the calibration matrix using the color data captured by the reference sensor and the color data captured by the target sensor. The calibration matrix can be stored in persistent memory (i.e., persistent memory 456 as shown in FIG. 4). The calibration matrix can be used to calibrate the target sensor.

In one embodiment, the raw sensor values used for the target data set are collected as a vector in the form as follows:

$$\sim v = [X, Y, Z, I]$$

A fifth parameter R can be used for scaling and can be attached to all raw data, which reads as follows:

$$R = (X^2 + Y^2 + Z^2)^{1/2}$$

$$\sim v \Rightarrow [X, Y, Z, I, R]$$

The pattern set (as described with respect to operation 606 and 614) includes 5 luminance values each for White, Red, Green, and Blue for a total of 20 patterns to be read by both the target and reference device. In one embodiment, the total 20 reads can be embodied as follows:

$$\{w1, w2, w3, w4, w5, r1, r2, r3, r4, r5, g1, g2, g3, g4, g5, b1, b2, b3, b4, b5\}$$

The 20 total reads can be accumulated as matrix T, as follows:

$$T = \begin{bmatrix} X_{w1} & Y_{w1} & Z_{w1} & I_{w1} & R_{w1} \\ X_{w2} & Y_{w2} & Z_{w2} & I_{w2} & R_{w2} \\ X_{w3} & \ldots & & & R_{w3} \\ X_{w4} & \ldots & & & R_{w4} \\ X_{w5} & \ldots & & & R_{w5} \\ X_{r1} & \ldots & & & \vdots \\ \vdots & \ddots & & & \vdots \\ X_{g1} & \ldots & & & \vdots \\ \vdots & \ddots & & & \vdots \\ X_{b1} & \ldots & & & \vdots \\ \vdots & \ddots & & & \vdots \\ X_{b5} & Y_{b5} & Z_{b5} & I_{b5} & R_{b5} \end{bmatrix}$$

Reference data can be collected using the identical pattern set and stored as the matrix R:

$$R = \begin{bmatrix} X_{w1} & Y_{w1} & Z_{w1} \\ X_{w2} & Y_{w2} & Z_{w2} \\ X_{w3} & \ldots & Z_{w3} \\ X_{w4} & \ldots & Z_{w4} \\ X_{w5} & \ldots & Z_{w5} \\ X_{r1} & \ldots & \vdots \\ \vdots & \ddots & \vdots \\ X_{g1} & \ldots & \vdots \\ \vdots & \ddots & \vdots \\ X_{b1} & \ldots & \vdots \\ \vdots & \ddots & \vdots \\ X_{b5} & Y_{b5} & Z_{b5} \end{bmatrix}$$

A gross calibration matrix (C) can be calculated to convert raw sensor data into usable X,Y,Z Tri-Chromatic data. The calibration matrix maps raw sensor data to scaled tristimulus values in units of (cd/m²).

$$C = (R^{Transpose} * T) * (T^{Transpose} * T)^{-1}$$

Where the final calibration matrix can be embodied as follows:

$$C = \begin{bmatrix} X_{CX} & Y_{CX} & Z_{CX} & I_{CX} & R_{CX} \\ X_{CY} & Y_{CY} & Z_{CY} & I_{CY} & R_{CY} \\ X_{CZ} & Y_{CZ} & Z_{CZ} & I_{CZ} & R_{CZ} \end{bmatrix}.$$

The initial calibration undergoes a second adjustment based on a calibration matrix as described in "Four-Color Matrix Method for Correction of Tristimulus Colorimeters Part 1" and "Four-Color Matrix Method for Correction of Tristimulus Colorimeters Part 2" to Yoshihiro Ohno and Jonathan E. Hardis, which is fully incorporated herein by reference. A single color vector from the sensor initial raw readings (i.e., target data set) can be constructed using the readings for White, Red, Green, and Blue. Each of these vectors can be passed through the final calibration matrix, C, to generate 4 unit adjusted color vectors as follows:

$$\partial_{UnitColor} = C * \partial_{RawColor}$$

$$\begin{bmatrix} X_{CX} & Y_{CX} & Z_{CX} & I_{CX} & R_{CX} \\ X_{CY} & Y_{CY} & Z_{CY} & I_{CY} & R_{CY} \\ X_{CZ} & Y_{CZ} & Z_{CZ} & I_{CZ} & R_{CZ} \end{bmatrix} \begin{bmatrix} X_{raw} \\ Y_{raw} \\ Z_{raw} \\ I_{raw} \\ R_{raw} \end{bmatrix} = \begin{bmatrix} X_c \\ Y_c \\ Z_c \end{bmatrix}$$

Following this pattern, 5 raw element vectors for White, Red, Green, and Blue can be passed through the initial unit calibration matrix, thus creating four new vectors that contain unit corrected XYZ tristimulus values.

$$\begin{bmatrix} X_{reference,255white} \\ Y_{reference,255white} \\ Z_{reference,255white} \end{bmatrix}, \begin{bmatrix} X_{reference,255red} \\ Y_{reference,255red} \\ Z_{reference,255red} \end{bmatrix}, \begin{bmatrix} X_{reference,255green} \\ Y_{reference,255green} \\ Z_{reference,255green} \end{bmatrix},$$

$$\begin{bmatrix} X_{reference,255blue} \\ Y_{reference,255blue} \\ Z_{reference,255blue} \end{bmatrix}$$

These four unit calibrated color vectors can be used in conjunction with the four reference values of the same patterns to derive a 3×3 calibration matrix, W, that anchors the calibration to a reference white point.

$$W_{whitepoint} = \begin{bmatrix} X_{WX} & Y_{WX} & Z_{WX} \\ X_{WY} & Y_{WY} & Z_{WY} \\ X_{WZ} & Y_{WZ} & Z_{WZ} \end{bmatrix}$$

The final calibration matrix can be calculated as follows:

$$M_{Final} = W_{whitepoint} * C_{unit}$$

The described system can separate the reference data set from the target data set, used to physically calibrate the sensor. This provides the physical separation of the element containing the sensor to be calibrated from the display that will use the sensor for display calibration purposes. Using this configuration a first-use calibration process that uses the factory stored reference data set and a captured target data set can be used in the numerical process to arrive at the sensor color calibration matrix.

The processes described with respect to FIGS. 5 and 6 can be implemented in several ways. For example, in a factory calibration scenario, with a built-in target sensor in the display device (as shown in FIG. 4A), the process can be completed using a computing system (e.g., computing system 450 as shown in FIGS. 4A-B) and a reference sensor to collect and store the reference data and a target sensor to collect the device specific data. The computing system can calculate the necessary calibration matrix and then transmit the calibration matrix to the display device.

In event where the target sensor is not tethered or built into the display device, the process can executed by implementing the calibration algorithm physically in the device under test. In this scenario, the device under test may control a reference device or an external computer and reference device can be used to capture the reference data and store said reference data in the device under test. The sensor calibration is then implemented at a later stage, by capturing data from the external sensor and using the previously captured reference data to compute the calibration of the sensor. This method is particularly suited to calibration of external sensors in a Television system.

FIGS. 7-10 depict various embodiments of the target sensors and display devices. In each of these embodiments, the target sensor can be calibrated using the process described with respect to FIGS. 5-6. In some embodiments, a target sensor can be calibrated prior to the first use of the display device. This configuration can be known as fixed factory calibration. Alternatively, or in addition to, the target sensor can be calibrated on the first use of the display device. This configuration can be known as "first use" calibration.

Figure 7:
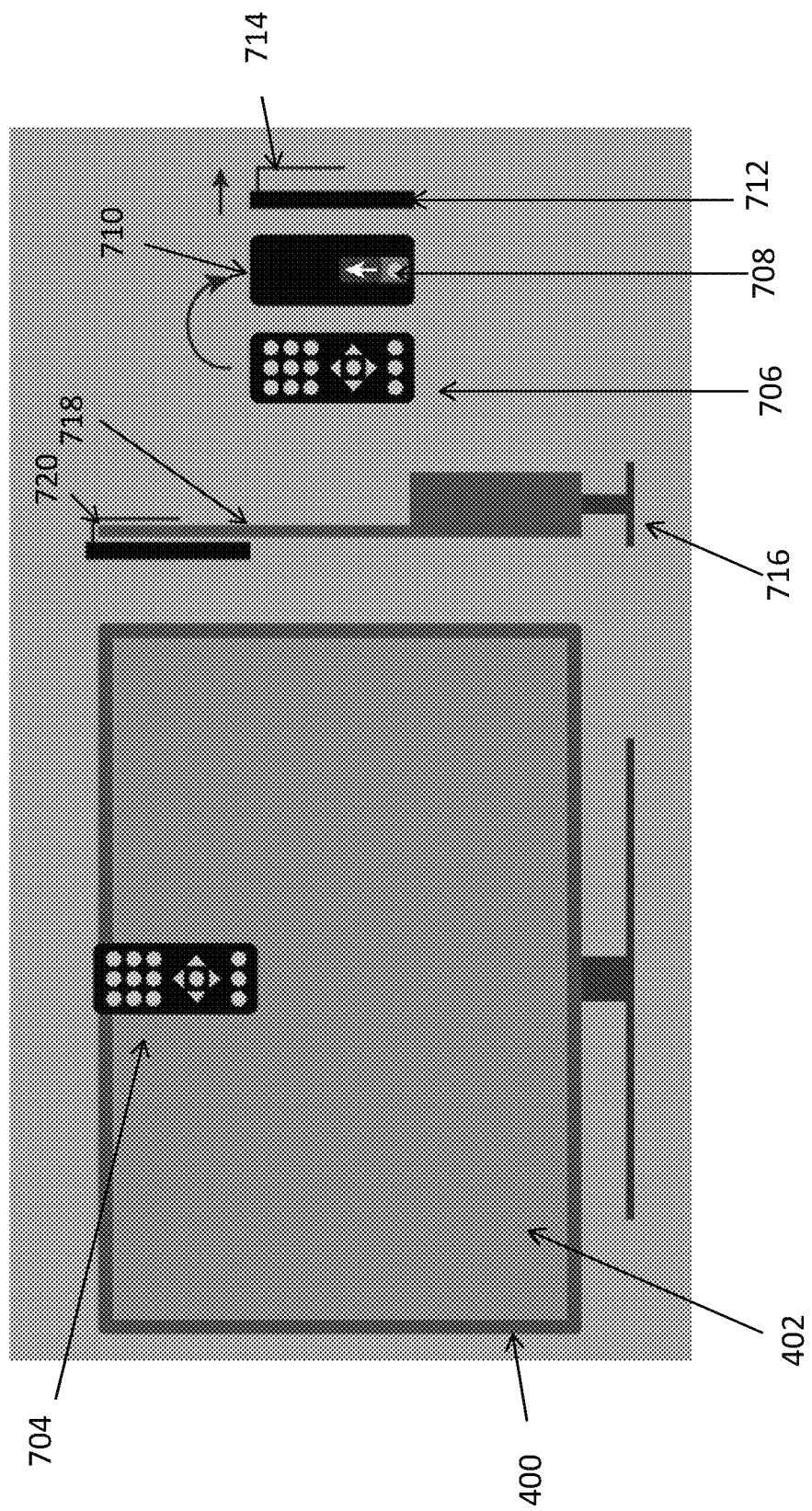
FIG. 7 depicts a sensor built in a remote in accordance with an exemplary embodiment.

FIG. 7 depicts a sensor 708 built in a remote 704 in accordance with an exemplary embodiment. In one embodiment, a sensor 708 can be embedded in a remote control 704 configured to control the operation of a display device 400 such as a television. The display device 400 can include a display screen 402. The display screen 402 can be a LCD or LED display.

The remote control 704 can include a front side 706 and a backside 710. The sensor 708 can be embedded in the backside 710 of the remote control 704. The side view 716 of the sensor 708 depicts a clip 714 disposed on the backside 710 of the sensor 708. The clip 714 can include a horizontal portion, extending from the backside 710 of the remote control 704 and a vertical portion, extending downward from the horizontal portion. The clip 714 can couple the remote control 704 to the display device 400, such that the front side 706 of the remote control 704 faces away from the display screen 402, the horizontal portion of the clip 714 extents across the top portion 720 of the display device 400, and the vertical portion of the clip 714 can extend down the backside 718 of the display device 400. In this position, the backside 706 of the remote control 708 faces the display screen 402 of the display device 400, such that the sensor 708 is interfacing with the display screen 402 of the display device. The side view 716 of the display device depicts the remote control 704 coupled to the display device 400.

In one embodiment, the display device 400 can be a television and the display screen 402 can be characterized in the factory and the reference data set can be stored in non-volatile memory in the display device. Upon first use of the display device 400, the calibration process, as described with respect to in FIGS. 5-6, can be employed to calibrate the embedded sensor 708 in the remote control 704. Bluetooth® communication or other NFC communication can be implemented to coordinate actions between the embedded sensor and the display device 400. The raw target data captured by the remote control 704, can be used to calculate the proper correction matrix as described with respect to FIG. 6 and the numerical process to establish the calibration matrix. The calibration matrix can be stored display device's 400 non-volatile memory. For example, the calibration application (i.e., calibration application 454 as shown in FIG. 4B) can reside in the display device 400. The calibration application can use the reference data set and the target data set captured by the reference and target sensors, respectively, and stored in the non-volatile memory (i.e., memory 405 as shown in FIG. 4B) to calculate the calibration matrix. The calibration matrix can be used to calibrate the sensor 708.

Figure 8:
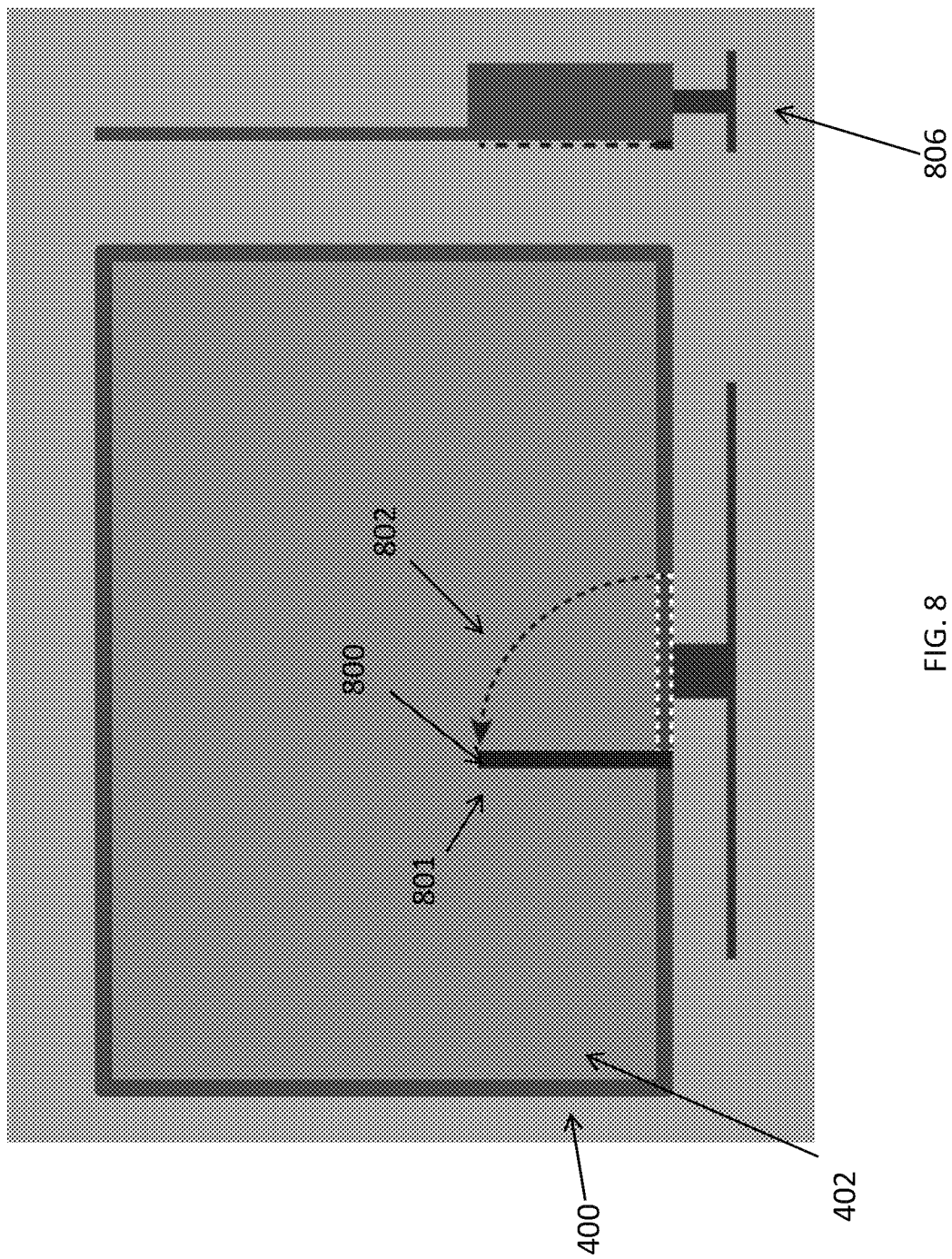
FIG. 8 depicts a sensor on a rotating mount in accordance with an exemplary embodiment.

FIG. 8 depicts a sensor 800 on a rotating mount 801 in accordance with an exemplary embodiment. In one embodiment, a sensor 800 can be coupled to the display device 400 using a rotating mount 801. In one example, the rotating mount 801 can be disposed on the bottom of the display screen 402 of the display device 400. In an initial position the rotating mount 801 can extend horizontally along the bottom of the display device 400. The rotating mount 801 can circumferencely rotate around a point at which the rotating mount 801 is coupled to the display device 400. The rotating mount 801 can rotate so that the sensor 800 interfaces with the display screen 402. The rotating mount 801 can rotate 180 degrees from its initial position. The rotating mount 801 can be moved into a position for calibration of the display and moved back down to its initial position for normal viewing.

As described above, in one embodiment, the display device 400 can be a television. In one embodiment, the calibration can be performed as described with respect to FIGS. 5-6 and the corresponding numerical method to arrive at the calibration matrix, using a fixed factory calibration. The calibration matrix can be stored in the non-volatile memory (i.e., memory 405 as shown in FIGS. 4A-B). The sensor 800 (i.e., target sensor) can be calibrated prior to first use of the display device 400. The side view 806 of the display device 400 can depict the placement of the sensor 800.

Figure 9:
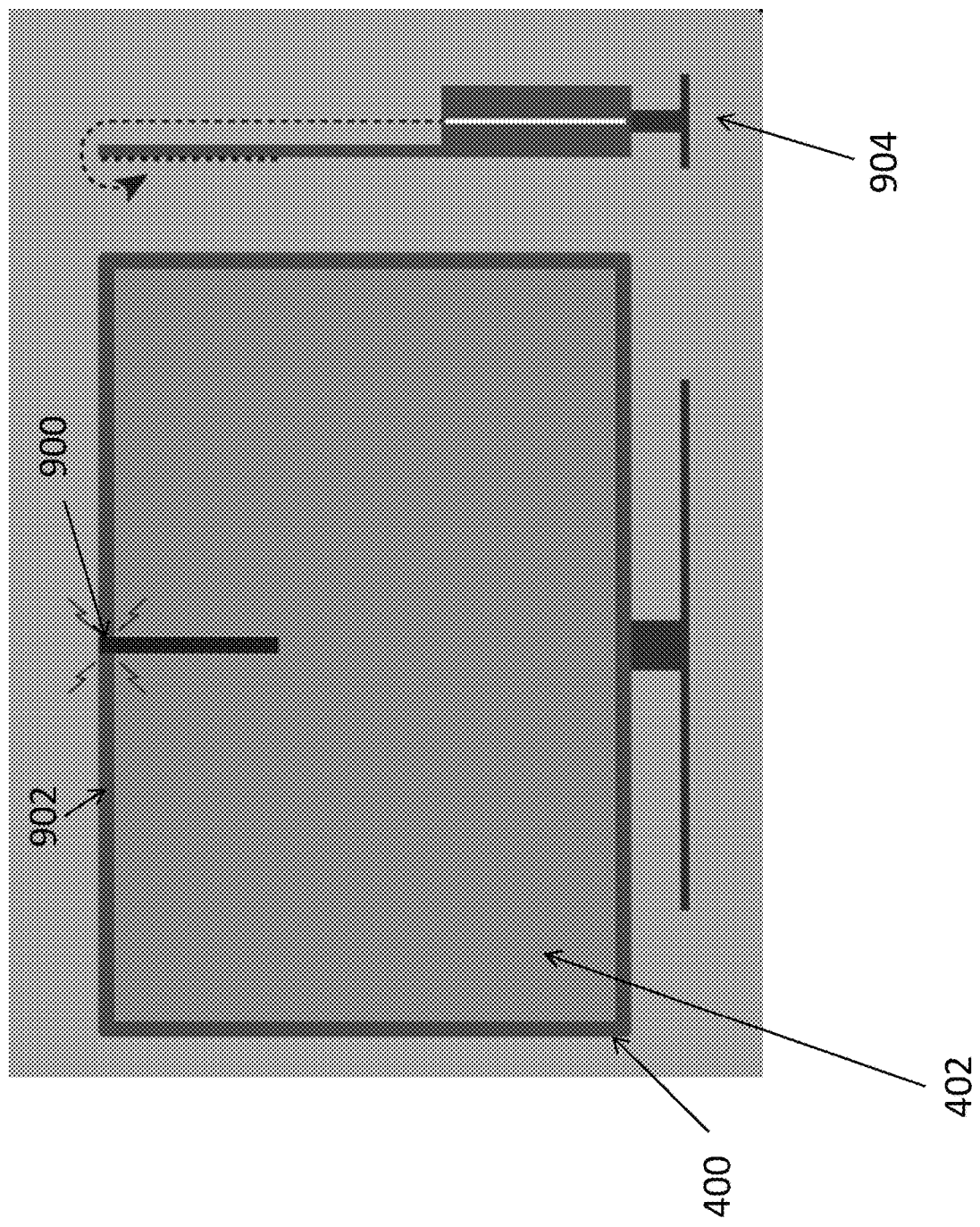
FIG. 9 depicts a sensor magnetically attached to a bezel in accordance with an exemplary embodiment.

FIG. 9 depicts an embedded calibrated sensor 900 that is magnetically attached to the bezel 902 of the display device 400. The sensor 900 can be embodied as a stand-alone calibration element that communicates to the TV via Bluetooth communication or other NFC interfaces. Similar to FIG. 7, the reference data set can be stored in the TV non-volatile memory and the sensor 900 calibration can be executed using a first-use calibration. In this regard, the raw target data captured by the sensor 900 can be used to calculate the proper calibration matrix as described with respect to FIG. 6 and the numerical process to establish the calibration matrix. The calibration matrix can be stored display device's 400 non-volatile memory (i.e., memory 405 as shown in FIGS. 4A-B). The side view 904 of the display device 400 can depict the placement of the sensor 900.

Figure 10:
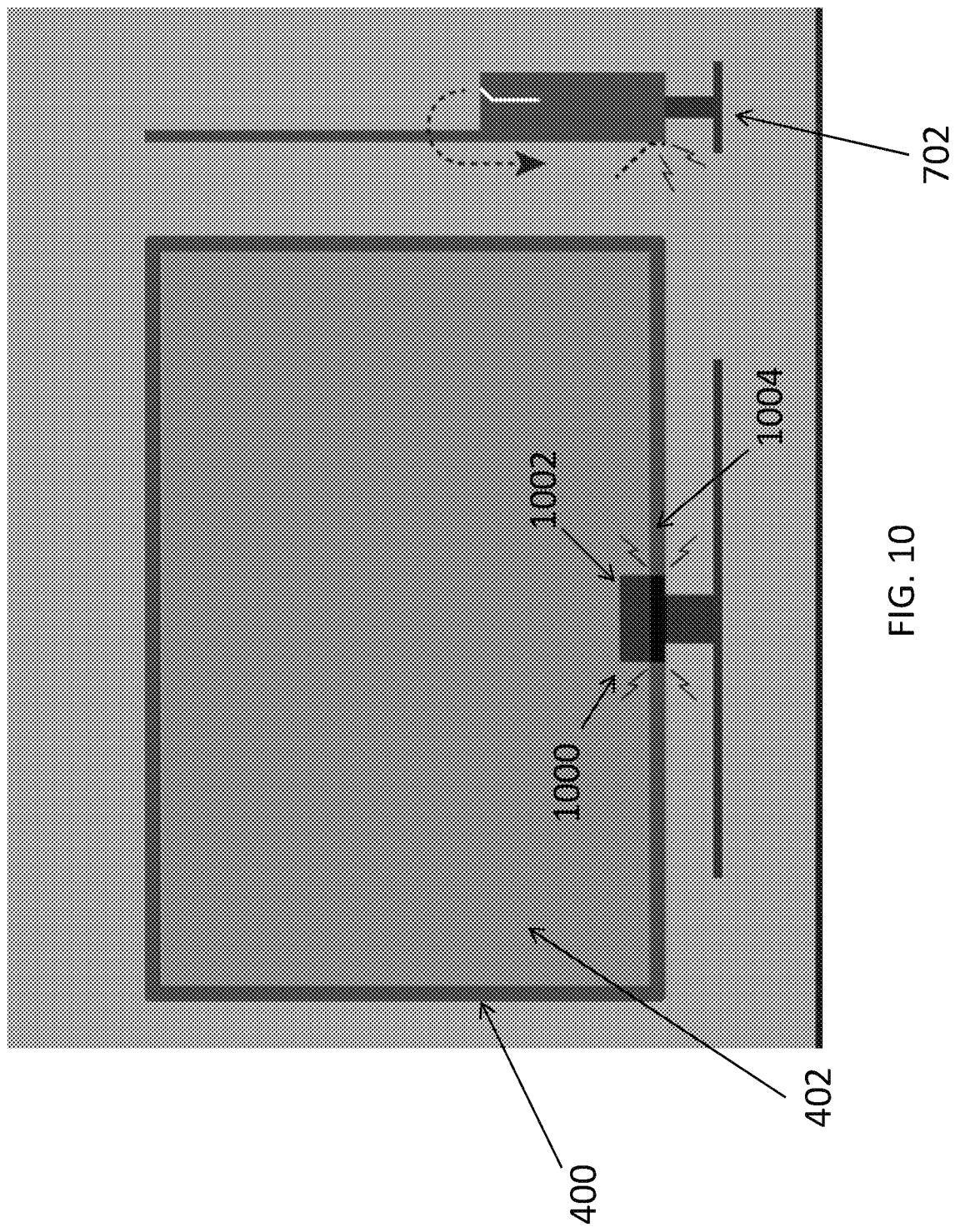
FIG. 10 depicts an optical mirror arrangement mounted magnetically to a display device in accordance with an exemplary embodiment.

FIG. 10 depicts a mirror periscope 1002 utilizing a sensor 1000 embedded in the bezel 1004 of a display device 400. In one embodiment, the embedded sensor 1000 can be used for detection of ambient illumination as well as display calibration when the mirror periscope 1002 is attached to the display device 400 to perform display calibration on the display screen 402. In this configuration either the fixed factory calibration or the first-use calibration can be implemented in the event the mirror periscope 1002 is not attached to the display device 400.

Figure 11:
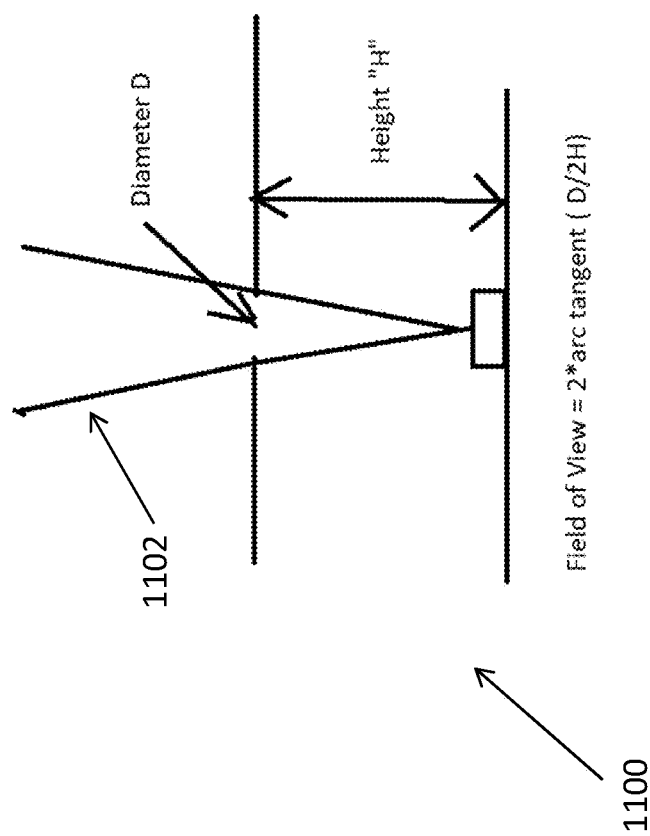
FIG. 11 is a block diagram depicting an exemplary design to minimize viewing angle differences.

FIG. 11 is a block diagram depicting an exemplary design to minimize viewing angle differences. An exemplary embedded target sensor should directly be relatable to the measurements of a standard reference sensor. Display devices including LCD display screens can change characteristics as a function of viewing angle. It can be important to manage the viewing angle of the target sensor to closely match, or be less than, the viewing angle of the reference sensor. The design 1100 minimizes the viewing angle 1102 differences between the target sensor and the reference sensor.

Figure 12:
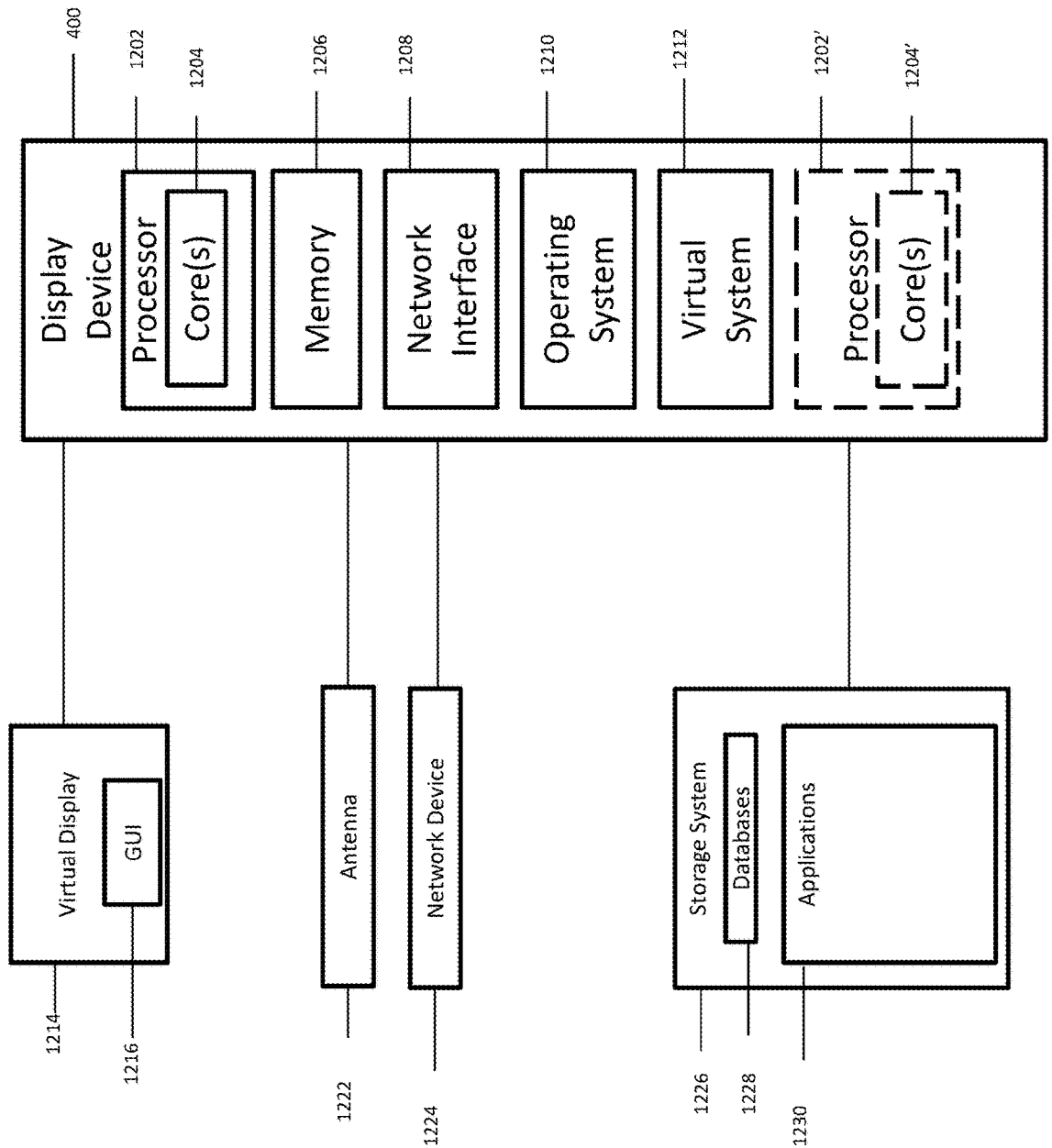
FIG. 12 illustrates a block diagram of an example display device for implementing exemplary embodiments of the present disclosure.

FIG. 12 is a block diagram of an exemplary device suitable for use in an embodiment. The device 1200 may be, but is not limited to, a smartphone, laptop, tablet, desktop computer, server, or network appliance. The device 1200 can be embodied as part of the computing system or the display device. The device 1200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1206 included in the device 1200 may store computer-readable and computer-executable instructions or software (e.g., applications 1230 such as the calibration application) for implementing exemplary operations of the device 1200. The device 1200 also includes configurable and/or programmable processor 1202 and associated core(s) 1204, and optionally, one or more additional configurable and/or programmable processor(s) 1202' and associated core(s) 1204' (for example, in the case of computer systems having multiple processors/cores), for executing computer-readable and computer-executable instructions or software stored in the memory 1206 and other programs for implementing exemplary embodiments of the present disclosure. Processor 1202 and processor(s) 1202' may each be a single core processor or multiple core (1204 and 1204') processor. Either or both of processor 1202 and processor(s) 1202' may be configured to execute one or more of the instructions described in connection with device 1200.

Virtualization may be employed in the device 1200 so that infrastructure and resources in the device 1200 may be shared dynamically. A virtual machine 1212 may be provided to handle a process running on multiple processors so that the process appears to be using only one computing resource rather than multiple computing resources. Multiple virtual machines may also be used with one processor.

Memory 1206 may include a computer system memory or random access memory, such as DRAM, SRAM, EDO RAM, and the like. Memory 1206 may include other types of memory as well, or combinations thereof.

The device 1200 can include a virtual display 1214 configured to render a graphical user interface (GUI) 1216. The virtual display 1214 can be embodied as the display screen (e.g., display screen as shown in FIGS. 4A-4B, 7-10). The virtual display 1214 can be multi-touch surface.

The device 1200 may also include one or more computer storage devices 1226, such as a hard-drive, CD-ROM, or other computer readable media, for storing data and computer-readable instructions and/or software that implement exemplary embodiments of the present disclosure (e.g., applications). For example, exemplary storage device 1226 can include one or more databases 1228 for storing information regarding sensor calibration. The databases 1228 may be updated manually or automatically at any suitable time to add, delete, and/or update one or more data items in the databases.

The device 1200 can include a network interface 1208 configured to interface via one or more network devices 1224 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), Near Field Communication (NFC) interfaces such as Bluetooth®, or some combination of any or all of the above. In exemplary embodiments, the computing system can include one or more antennas 1222 to facilitate wireless communication (e.g., via the network interface) between the device 1200 and a network and/or between the device 1200 and other devices. The network interface 1208 may include a built-in network adapter, network interface card, PCMCIA network card, card bus network adapter, wireless network adapter, USB network adapter, modem or any other device suitable for interfacing the device 1200 to any type of network capable of communication and performing the operations described herein. It can be appreciated that the device 1200 can be an Internet of Things (IoT) device.

The device 1200 may run any operating system 1210, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the device 1200 and performing the operations described herein. In exemplary embodiments, the operating system 1210 may be run in native mode or emulated mode. In an exemplary embodiment, the operating system 1210 may be run on one or more cloud machine instances.

Figure 13:
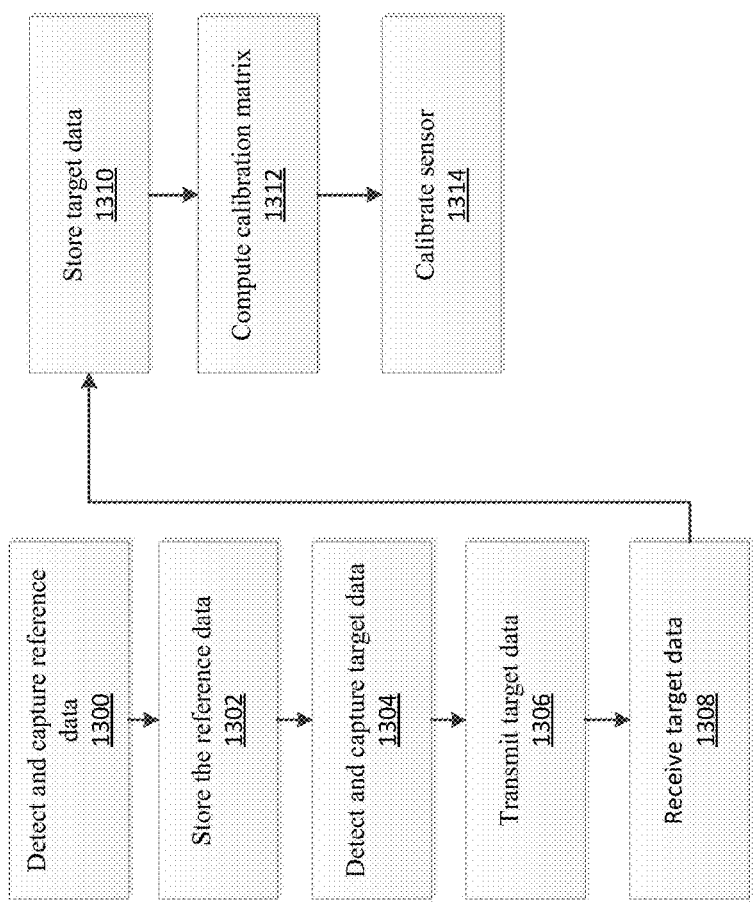
FIG. 13 is a flowchart for implementing the color calibration system according to an exemplary embodiment of the present disclosure.

FIG. 13 is a flowchart for implementing the color calibration system according to an exemplary embodiment of the present disclosure. In operation 1300, a reference sensor of a computing system can detect and capture reference data based on display data rendered on the display screen of the display device. The computing system can be in communication with a display device, and can include a processor, persistent memory, temporary memory and execute an instance of a calibration application. In operation 1302, the computing system can store the reference data in the temporary memory. In operation 1304, a target sensor of the display device including non-volatile memory and a display screen can detect and capture target data based on display data rendered on the display screen of the display device. In operation 1306, the display device can transmit the target data to the computing system. In operation 1308, the computing system can receive the target data. In operation 1310, the computing system can store the target data in the temporary memory. In operation 1312, the calibration application of the computing system can derive a calibration matrix using the reference and target data stored in the temporary memory. In operation 1312, the computing system can calibrate the target sensor using the calibration matrix.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A color calibration system comprising:
a display device including a non-volatile memory, a display screen, and a target sensor;
a computing system in communication with the display device and including a processor, a persistent memory, a temporary memory, and a reference sensor, the computing system executing an instance of a calibration application, the computing system configured to:
  detect and capture, via the reference sensor, reference data based on a display data rendered on the display screen of the display device, the display data including a plurality of luminance patterns and a plurality of color patterns;
  store the reference data in the temporary memory;
wherein the display device is configured to:
  detect and capture, via the target sensor, target data based on the display data rendered on the display screen of the display device;
  transmit the target data to the computing system;
wherein the computing system is configured to:
  receive the target data;
  store the target data in the temporary memory;
  derive, via the calibration application, a linear calibration for the target sensor based on the reference data and the target data, the reference and target data including luminance data captured by the reference and target sensors based on each of the plurality of luminance patterns;
  derive, via the calibration application, a calibration matrix using the reference and target data stored in the temporary memory, the reference and target data including color data; and
  calibrate the target sensor using the calibration matrix.

2. The system of claim 1, wherein in response to the computing system deriving the linear calibration, the display screen of the display device is configured to display the plurality of color patterns.

3. The system of claim 2, wherein the target and reference sensors are configured to capture the color data based on each of the plurality of color patterns rendered on the display screen.

4. The system of claim 3, wherein the computing system is configured to derive, via the calibration application, the calibration matrix based on the color data captured by the target and reference sensors.

5. The system of claim 1, wherein the target data includes color data and near infrared data and reference data includes color data.

6. The system of claim 5, wherein the target sensor is configured to capture color and near infrared data and the reference sensor is configured to capture the color data based on the each of the plurality of color patterns rendered on the display screen.

7. The system of claim 1, wherein the display screen is a LED, OLED, or LCD display.

8. The system of claim 1, wherein the display device is at least one of: television, computer monitor, or mobile device screen.

9. The system of claim 1, wherein the target sensor is embedded in a remote control mounted to the display device, the target sensor being in a position to interface with the display screen of the display device.

10. The system of claim 1, wherein the target sensor is embedded in a rotating mount coupled to the display device.

11. The system of claim 1, wherein the target sensor is magnetically attached to a bezel of the display device.

12. The system of claim 1, wherein a mirror periscope includes the sensor and is embedded in a bezel of the display device.

13. A color calibration method comprising:
displaying, via a display screen of a display device, display data including a plurality of luminance patterns and a plurality of color patterns;
detecting and capturing, via a reference sensor of a computing system, reference data based on the display data rendered on the display screen of the display device;
storing, via the computing system, the reference data in temporary memory;
detecting and capturing, via a target sensor of the display device, target data based on the display data rendered on the display screen of the display device;
transmitting, via the display device, the target data to the computing system;
receiving, via the computing system, the target data;
storing, via the computing system, the target data in the temporary memory;
deriving, via the calibration application of the computing system, a linear calibration for the target sensor based on the reference and target data, the reference and target data including luminance data captured by the reference and target sensors for each of the plurality of luminance patterns rendered on the display screen;
deriving, via the calibration application executing on the computing system, a calibration matrix using the reference and target data stored in the temporary memory, the reference and target data including color data; and
calibrating, via the computing system, the target sensor using the calibration matrix.

14. The method of claim 13, further comprising displaying, via the display screen of the display device, the plurality of color patterns in response to the computing system deriving the linear calibration.

15. The method of claim 14, further comprising capturing, via the reference and target sensors, the color data based on each of the plurality of color patterns rendered on the display screen.

16. The method of claim 15, further comprising deriving, via the calibration application executing on the computing system, the calibration matrix based on the color data captured by the target and reference sensors.

17. The method of claim 13, wherein the target data includes color and near infrared data and reference data includes color data.

18. The method of claim 17, further comprising capturing, via the target and reference sensors, the color data based on the each of the plurality of color patterns rendered on the display screen.

* * * * *